United States Patent
Ueyama et al.

(10) Patent No.: US 7,018,719 B2
(45) Date of Patent: Mar. 28, 2006

(54) LOW-TEMPERATURE IMPACT-RESISTANT POLYAMIDE-BASED STRETCH-ORIENTED MULTILAYER FILM

(75) Inventors: Takahisa Ueyama, Ibaraki-ken (JP); Tadayoshi Itoh, Ibaraki-ken (JP); Takeo Higashi, Ibaraki-ken (JP)

(73) Assignee: Kureha Corporation, Tokyo (JP)

( * ) Notice: Subject to any disclaimer, the term of this patent is extended or adjusted under 35 U.S.C. 154(b) by 224 days.

(21) Appl. No.: 10/311,929

(22) PCT Filed: Jun. 22, 2001

(86) PCT No.: PCT/JP01/05349

§ 371 (c)(1),
(2), (4) Date: Dec. 20, 2002

(87) PCT Pub. No.: WO01/98081

PCT Pub. Date: Dec. 27, 2001

(65) Prior Publication Data

US 2003/0157350 A1   Aug. 21, 2003

(30) Foreign Application Priority Data

Jun. 22, 2000   (JP) .............................. 2000-188103

(51) Int. Cl.
*B32B 27/08* (2006.01)
(52) U.S. Cl. .................. 428/474.4; 428/195; 428/212; 428/500
(58) Field of Classification Search ............. 428/474.4, 428/212, 195, 500; 264/776.1
See application file for complete search history.

(56) References Cited

U.S. PATENT DOCUMENTS

| | | | | |
|---|---|---|---|---|
| 4,732,795 A * | 3/1988 | Ohya et al. | ................ | 428/34.9 |
| 4,765,999 A * | 8/1988 | Winter | ....................... | 426/113 |
| 4,883,693 A * | 11/1989 | Ohya et al. | ................ | 428/34.9 |
| 4,965,135 A * | 10/1990 | Im et al. | ..................... | 428/412 |
| 4,977,022 A * | 12/1990 | Mueller | ...................... | 428/349 |
| 5,035,851 A * | 7/1991 | Schirmer | .................... | 264/514 |
| 5,336,549 A * | 8/1994 | Nishimoto et al. | ......... | 428/213 |
| 5,846,620 A | 12/1998 | Compton | .................. | 428/35.7 |
| 6,063,221 A * | 5/2000 | Weinberg et al. | ........... | 156/203 |
| 6,106,935 A * | 8/2000 | Lambert et al. | ............ | 428/220 |
| 6,291,041 B1 * | 9/2001 | Howells et al. | ............ | 428/35.4 |
| 6,500,559 B1 * | 12/2002 | Hofmeister et al. | ..... | 428/474.4 |
| 6,562,476 B1 * | 5/2003 | Shepard et al. | ........... | 428/475.8 |
| 6,565,985 B1 * | 5/2003 | Ueyama et al. | .......... | 428/474.4 |
| 6,699,549 B1 * | 3/2004 | Ueyama et al. | ............ | 428/36.7 |
| 6,861,125 B1 * | 3/2005 | Carlson et al. | .......... | 428/195.1 |

FOREIGN PATENT DOCUMENTS

| | | | |
|---|---|---|---|
| EP | 0 692 374 | | 1/1996 |
| EP | 0 974 452 | | 1/2000 |
| JP | 04-099621 | * | 3/1992 |
| JP | 11-300914 | * | 11/1999 |
| WO | 99/56951 | | 11/1999 |

* cited by examiner

*Primary Examiner*—Terressa Boykin
(74) *Attorney, Agent, or Firm*—Wenderoth, Lind & Ponack, L.L.P.

(57) ABSTRACT

A stretch-oriented multilayer film suited for use as a freeze packaging material, a deep drawing packaging material, a vertical pillow packaging material, etc., is provided as a stretch-oriented multilayer film, comprising at least three layers including a surface layer (a) comprising a thermoplastic resin, an intermediate layer (b) comprising a polyamide resin and a surface layer (c) comprising a sealable resin, said multilayer film exhibiting an impact energy of at least 1.5 Joule at a conversion thickness of 50 μm at −10° C. The multilayer film is produced through an inflation process using water having a large capacity as a cooling and a heating medium and including a combination of a high degree of stretching and a high degree of relaxation heat treatment not exercised heretofore.

54 Claims, 1 Drawing Sheet

LOW-TEMPERATURE IMPACT-RESISTANT POLYAMIDE-BASED STRETCH-ORIENTED MULTILAYER FILM

TECHNICAL FIELD

The present invention relates to a stretch-oriented (i.e., stretched and oriented) multilayer film including a polyamide resin layer as a principal resin layer and having an excellent low-temperature impact resistance.

BACKGROUND ART

Hitherto, it has been widely practiced to use a stretch-oriented film for packaging processed livestock meat, fresh fish meat, raw meat, soup, etc. Particularly, for packaging of frozen food and vacuum packaging livestock meat with bones and fish meat, such a stretch-oriented packaging film is required to have excellent anti-pinhole property and mechanical strength, and a multilayer film including a polyamide resin layer has been generally used therefor.

Particularly, in the case of requiring a relatively thin multilayer film, a multilayer film including a stretched polyamide resin layer has been suitably used.

For production of a multilayer film including a stretched polyamide resin layer, there has been generally practiced a process comprising dry lamination or extrusion lamination of an unstretched polyolefin resin layer onto a stretched polyamide resin layer. However, in the case of necessitating excellent anti-pinhole property and mechanical strength, such a lamination film is caused to have a complicated layer structure, which requires an increased number of production steps and an increased film thickness for ensuring the strength, thus leading to an increased production cost.

For the purpose of reducing the production steps, the multilayer stretching of a co-extruded multilayer film has been commercialized, but this is accompanied with a problem such that the produced film is liable to have an excessively large shrinkability, which makes difficult the secondary processing, such as bag-making, printing or packaging by means of an automatic packaging machine. Particularly, in the case of packing a soup in a hot state into a pouch of such a multilayer film or by automatic packaging with such a multilayer film, the packing becomes difficult due to the film shrinkage.

It has been known that a multilayer film including a stretched polyamide resin layer has an excellent low-temperature strength, but it has been also believed inevitable that the strength is remarkably lowered at a temperature as low as −10° C. for packaging a frozen product.

DISCLOSURE OF INVENTION

A principal object of the present invention is to provide a polyamide-based stretch-oriented multilayer film having an improved low-temperature impact resistance.

Another object of the present invention is to provide a polyamide-based stretch-oriented multilayer film excellent in mechanical properties, such as piercing strength and anti-pinhole property.

A further object of the present invention is to provide a polyamide-based stretch-oriented multilayer film which is free from excessive shrinkability and is excellent in boiling resistance, processability as by deep drawing or adaptability to packaging machines.

According to our study, it has become possible to obtain a polyamide-based stretch-oriented multilayer film having a remarkably improved low-temperature impact resistance while retaining ordinary physical properties such as a tensile strength by duly noting the position of the polyamide resin layer and effecting appropriate stretching process and post-heat treatment. It has been also discovered that the multilayer film is also provided with remarkable improvement in the above-mentioned objective physical properties and processing characteristics, which are presumably attributable to a molecular orientation state of the film having provided the improvement in low-temperature impact resistance.

According to the present invention based on the above knowledge, there is provided a stretch-oriented multilayer film, comprising at least three layers including a surface layer (a) comprising a thermoplastic resin, an intermediate layer (b) comprising a polyamide resin and a surface layer (c) comprising a sealable resin, said multilayer film exhibiting an impact energy of at least 1.5 Joule at a conversion thickness of 50 μm at −10° C.

The present invention further provides a preferred process for producing the above-mentioned stretch-oriented multilayer film. Thus, according to the present invention, there is also provided a process for producing a stretch-oriented multilayer film, comprising the steps of:

co-extruding at least three species of melted thermoplastic resins to form a tubular product comprising at least three layers including an outer surface layer (a) comprising a thermoplastic resin other than polyamide resin, an intermediate layer (b) comprising a polyamide resin and an inner surface layer (c) comprising a sealable resin, cooling with water the tubular product to a temperature below a lowest one of the melting points of the thermoplastic resin, the polyamide resin and the sealable resin constituting the layers (a), (b) and (c), re-heating the tubular product to a temperature which is at most the lowest one of the melting points of the thermoplastic resin, the polyamide resin and the sealable resin constituting the layers (a), (b) and (c), vertically pulling the tubular product while introducing a fluid into the tubular product to stretch the tubular product in the vertical direction and the circumferential direction, thereby providing a biaxially stretched tubular film, folding the tubular film, again introducing a fluid into the folded tubular film to form a tubular film, heat-treating the tubular film from its outer surface layer (a) with steam or warm water until a relaxation ratio reaches at least 20% in at least one of the vertical direction and the circumferential direction, and cooling the heat-treated tubular film to provide a stretch-oriented multilayer film exhibiting an impact energy of at least 1.5 Joule at a conversion thickness of 50 μm at −10° C.

Some history and details as to how we have arrived at the present invention as a result of study for achieving the above object, will now be briefly discussed.

As mentioned above, it has been well known that a multilayer film inducing a polyamide resin layer as a principal layer provides a packaging material excellent in various properties. Our research group has also disclosed a stretch-oriented multilayer film having a basic laminate structure of polyester resin/polyamide resin/sealable resin as a heat-shrinkable film with excellent physical properties (JP-A 4-99621, U.S. Pat. No. 5,336,549), and has further disclosed that a multilayer film having such a laminate structure can achieve an effective reduction in heat-shrinkage stress which can be obstacle to automatic packaging, while retaining a preferred degree of heat-shrinkability (JP-A 11-300914, WO 99/55528). Particularly, the latter WO '528 publication discloses a process including steps of subjecting a biaxially stretched tubular film of the above-mentioned laminate structure after stretching at a ratio of 2.5–4.0 times both in a vertical direction and in a circumferential direction to a heat treatment with steam or warm water at 60–98° C. and then cooling the heat-treated film, to proved a biaxially stretched film exhibiting a heat-shrinkage stress at 50° C. of at most 3 MPa both in longitudinal direction and in transverse direction, and a hot water shrinkability at 90° C. of at least 20%. The invention of the WO '528 publication aims at production of a heat-shrinkable film, and in its Examples, the relaxation ratio in the post-heat treatment after the biaxial stretching remained at a level of 15% at the most. In contrast thereto, we have tried a heat treatment with steam or warm water causing a larger relaxation ratio of 20% or higher after a biaxial stretching at ratios identical to or even higher than those adopted in the WO '528 publication. As a result thereof, it has been unexpectedly found possible to obtain a remarkably improved low-temperature impact resistance represented by an impact energy at −10° C. while retaining ordinary film strength as represented by a tensile strength.

As an ordinary practice, a highly stretched film is not daringly subjected to heat treatment for a high degree of relaxation. A first reason thereof is that a heat treatment for a high degree of relaxation has not been believed desirable since such a relaxation heat treatment functions to deliberately lower a rigidity and a strength of a film, the increase of which is a principal purpose of a high degree of stretching. More specifically, a relaxation heat treatment of a highly stretched, even if performed, should be suppressed to such a level as to moderate a difficulty accompanying a high degree of stretching, i.e., an excessively large heat shrinkage stress, and a higher degree of relaxation heat treatment, if performed, has been believed to only result in a decrease of the effect of the high degree of stretching and not provide an additional effect. As another reason, one advantage attained by a high degree of stretching is the possibility of obtaining a film of a large width by using a film forming apparatus of a relatively small scale. However, a high degree of relaxation heat treatment functions to completely negate the effect, and requires a large scale apparatus for producing a film of a large width. Further, a high degree of relaxation heat treatment lowers the productivity of film on an area-basis and can result in a remarkably lower yield due to occurrence of film products failing to satisfy a regulation of width.

Unexpectedly, however, it has been found possible to obtain a remarkable increase in low-temperature impact resistance by the process of the present invention represented by the above-mentioned combination of high degree of stretching and high degree of relaxation heat treatment. The reason thereof has not been fully clarified as yet but may be presumed as follows. The film of the present invention at a stage after a high degree of stretching (that is inevitably required for allowing a subsequent high degree of relaxation heat treatment since a degree of relaxation exceeding a hot water shrinkability of a film after the stretching treatment is impossible) is composed of film-constituting molecules including a crystalline portion and an amorphous portion which have been both molecular-oriented to provide increased tensile strength, etc. The film in this state is liable to show a reduced elongation at breakage, but the orientation of the amorphous portion is sufficiently relaxed owing to a subsequent high degree of relaxation heat treatment while retaining the orientation of the crystalline portion, whereby a remarkable increase in elongation at breakage is understood to result while retaining absolute strengths such as a tensile strength. Further, the increased elongation at breakage due to the relaxation of the amorphous portion is understood to be associated with improved other film properties also aimed at by the present invention, i.e., improvements in piercing strength, anti-pinhole property, deep-drawing processability requiring easiness of elongation, vertical pillow packaging (or vertical type forming, filing and closing packaging) characteristic requiring a thin, pliable but tough film, lid-adaptability and boiling resistance requiring low shrinkability, etc.

As described above, in order to obtain a stretch-oriented multilayer film having an improved low-temperature impact resistance according to the present invention, a combination of a high degree of stretching and a high degree of relaxation heat treatment is essential. For realizing the combination, it is essential to include a principal resin layer comprising a polyamide resin which is adapted to a high degree of stretching and acquires remarkably improved mechanical strength thereby. In the process of the present invention, the polyamide resin layer is further used as an intermediate layer to realize the high degree of stretching—high degree of relaxation heat treatment. More specifically, in order to allow the high degree of stretching—high degree of relaxation heat treatment, the resinous tubular product (parison) after the heat melting extrusion is quenched with water as a cooling medium exhibiting good heat efficiency, whereby a stretching stress is effectively applied to resin molecules in the subsequent biaxial stretching step. Further, also in the subsequent post-heat treatment, a high degree of relaxation heat treatment is performed effectively by using steam or warm water as a heating medium having a large heat capacity. However, the polyamide resin is moisture-absorptive, so that if the polyamide resin is exposed to the surface layer, the resinous tubular product after the melt extrusion absorbs water at the time of water quenching to lower the effect of the high degree of stretching treatment. Accordingly, in the process of the present invention, a polyamide resin layer excellent in stretchability and mechanical properties after the stretching is used as a principal intermediate layer, and water showing excellent thermal efficiency as heating and cooling media to realize the high degree of stretching—high degree of relaxation heat treatment, thereby succeeding in production of a stretch-oriented multilayer film having a remarkably increased low-temperature impact resistance.

DETAILED DESCRIPTION OF THE INVENTION

Figure 1:
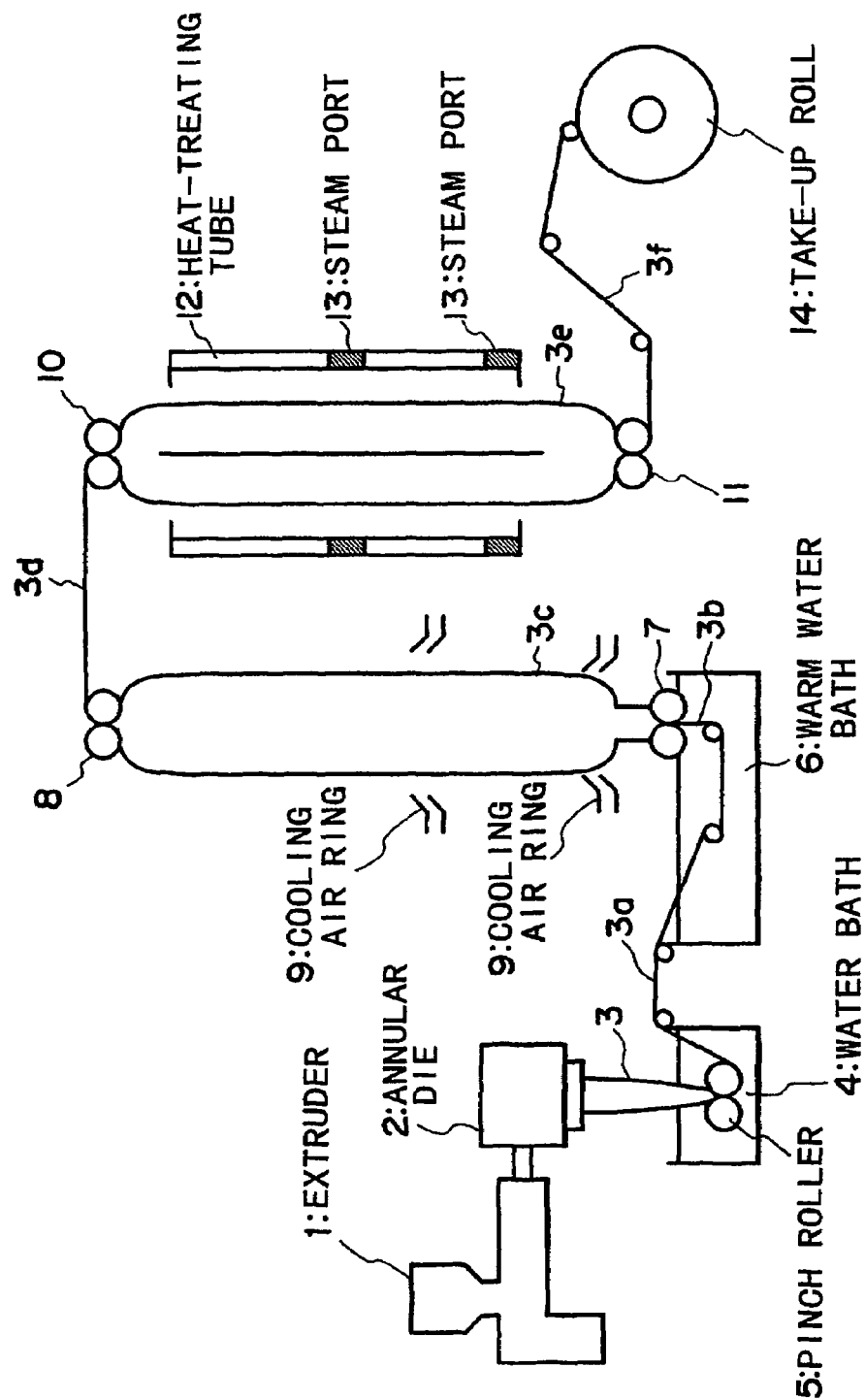
FIG. 1 the sole FIGURE in the drawing, is a schematic illustration of an apparatus system suitable for practicing an embodiment of the process for producing a stretch-oriented multilayer film according to the invention.

The stretch-oriented multilayer film according to the present invention comprises at least three layers including a surface layer (a) comprising a thermoplastic resin, an intermediate layer (b) comprising a polyamide resin and a surface layer (c) comprising a sealable resin.

The thermoplastic resin constituting the surface layer (a) is required to provide a surface layer (a) which, in the state of lamination with the intermediate layer (b) comprising a polyamide resin, is required to exhibit an appropriate degree of stretchability and obstruct moisture penetration to the intermediate layer. The thermoplastic resin may preferably have a lower moisture-absorptivity than the polyamide resin. Preferred examples of the thermoplastic resin may include: polyolefin resins which have been conventionally used for polyamide resin-based laminate films, inclusive of polyethylenes, such as LLDPE (linear low-density polyethylene), VLDPE (linear very low-density polyethylene) and LDPE (low-density polyethylene) (polyethylenes herein including those polymerized with single-site catalysts (or metallocene catalysts) in addition to those polymerized by conventional catalysts (Ziegler-Natta catalysts)); polypropylene, propylene-ethylene copolymer, propylene-ethylene-butene-1 copolymer, ethylene-vinyl acetate copolymer, ethylene-acrylic acid copolymer, ethylene-methacrylic acid copolymer, and ethylene-ethyl acrylate copolymer, wherein comonomers other than olefin occupy a relatively minor proportion (below 50 wt. %); and also polyester resin, etc. Among these, a polyester resin is excellent in surface properties, such as transparency, surface hardness, printability and heat resistance, and is a particularly preferable material for the surface layer (a).

The polyester resin (PET) preferably constituting the surface layer (a) may comprise either an aliphatic polyester resin or an aromatic polyester resin.

More specifically, examples of dicarboxylic acids constituting the polyester resin may include: terephthalic acid, isophthalic acid, phthalic acid, 5-t-butylisophthalic acid, naphthalenedicarboxylic acid, diphenyl ether dicarboxylic acid, cyclohexane-dicarboxylic acid, adipic acid, oxalic acid, malonic acid, succinic acid, agelaic acid, sebacic acid, and dimer acids comprising dimers of unsaturated fatty acids. These acids may be used singly or in combination of two or more species. Examples of diols constituting the polyester resin may include: ethylene glycol, propylene glycol, tetramethylene glycol, neopentyl glycol, hexamethylene glycol, diethylene glycol, polyalkylene glycol, 1,4-cyclohexane-dimethanol, 1,4-butanediol, and 2-alkyl-1,3-propane diol. These diols may be used singly or in combination of two or more species.

Among these, it is preferred to use an aromatic polyester resin including an aromatic dicarboxylic acid component, particularly preferably a polyester formed from terephthalic acid as the dicarboxylic acid and a diol having at most 10 carbon atoms, such as polyethylene terephthalate or polybutylene terephthalate. It is also preferred to use a co-polyester resin formed by replacing a portion, preferably at most 30 mol. %, more preferably at most 15 mol. %, of the terephthalic acid with another dicarboxylic acid, such as isophthalic acid, or a copolyester resin between terephthalic acid and a mixture of diols, such as ethylene glycol and 1,4-cyclohexanediol (e.g., "Kodapack PET#9921", available from Eastoman Kodak Co.).

The polyester resin may preferably be one having an intrinsic viscosity of ca. 0.6–1.2. The outer surface layer (a) can contain up to 20 wt. % of a thermoplastic resin other than the polyester resin, such as a thermoplastic elastomer as represented by thermoplastic polyurethane, or a polyolefin resin modified with an acid, such as maleic acid, or an anhydride thereof.

The thickness of the surface layer (a) comprising a thermoplastic resin other than polyamide resin may preferably be smaller than that of the intermediate layer (a), particularly at least 6% and below 50% of that of the intermediate layer (b), so as not to impair the excellent stretchability and mechanical properties of the intermediate layer (b) comprising a polyamide resin.

Examples of the polyamide resin (PA) constituting the intermediate layer (b) may include: aliphatic polyamides, such as nylon 6, nylon 66, nylon 11, nylon 12, nylon 69, nylon 610 and nylon 612; and aliphatic co-polyamides, such as nylon 6/66, nylon 6/69, nylon 6/610, nylon 66/610, and nylon 6/12. Among these, nylon 6/66 and nylon 6/12 are particularly preferred in view of moldability and processability. These aliphatic (co-)polyamides may be used singly or in mixture of two or more species. It is also possible to use a blend of such an aliphatic (co-)polyamide with a minor amount of an aromatic polyamide. Herein, the aromatic polyamide means a polycondensation product between a diamine and a dicarboxylic acid, at least one of which contains at least partially an aromatic unit. An aromatic co-polyamide is preferred. Examples thereof may include: a copolymer of an aliphatic nylon and an aromatic polyamide including an aromatic diamine unit, such as nylon 66/610/MXD6 (wherein "MXD6" represents polymetaxylylene adipamide), and a copolymer of an aliphatic nylon and an aromatic polyamide including an aromatic carboxylic acid unit, such as nylon 66/69/6I, nylon 6/6I and nylon 6I/6T (wherein "(nylon) 6I" represents polyhexamethylene isophthalamide, and "(nylon) 6T" represents polyhexamethylene terephthalamide). These polyamide resins may be used singly or in mixture so as to provide a melting point of preferably 160–210° C. The intermediate layer (b) can contain up to ca. 30 wt. % of a thermoplastic resin other than the polyamide resin, such as a polyolefin resin modified with an acid, such as maleic acid, or an anhydride thereof, ethylene-acrylic acid copolymer, ethylene-methacrylic acid copolymer, ionomer resin, or (partially) saponified ethylene-vinyl acetate copolymer.

The sealable resin constituting the inner surface layer (c) may be appropriately selected from thermoplastic resins inclusive of: polyolefins polymerized by using a single-site catalyst or metallocene catalyst (sometimes abbreviated as "SSC") inclusive of linear low-density polyethylene (abbreviated as "SSC-LLDPE") and very low-density polyethylene (abbreviated as "SSC-VLDPE"); conventional types of ethylene-α-olefin copolymers inclusive of "LLDPE" and "VLDPE" in terms of generally accepted abbreviations; ethylene-vinyl acetate copolymer (abbreviated as "EVA"), ethylene-methacrylic acid copolymer (abbreviated as "EMAA"), ethylene-methacrylic acid-unsaturated aliphatic carboxylic acid copolymer, low-density polyethylene, ionomer resin (abbreviated as "IO (resin)"), ethylene-acrylic acid copolymer, ethylene-methyl acrylate copolymer (abbreviated as "EMA"), and ethylene-butyl acrylate copolymer (abbreviated "EBA"). Such a preferred class of sealable resins may be termed as an ethylene copolymer, typically a copolymer of a major amount (i.e., more than 50 wt. %) of ethylene with a minor amount (i.e., less than 50 wt. %, preferably up to 30 wt. %) of a vinyl monomer copolymerizable with ethylene selected from the group consisting of α-olefins having 3 to 8 carbon atoms, and unsaturated carboxylic acids and unsaturated esters of carboxylic acids having up to 8 carbon atoms, inclusive of acrylic acid, methacrylic acid, acrylate esters, methacrylate esters and vinyl acetate, or an acid-modified product of the ethylene copolymer (preferably modified with up to 3 wt. % of an unsaturated carboxylic acid). It is also possible to use a thermoplastic resin, such as thermoplastic resin, such as polypropylene resin, polyester resin or aliphatic nylon. The sealable resin may preferably have a melting point of at most 150° C., more preferably at most 135° C. It is also possible to use a blend including at least one species of such a sealable resin within an extent of not impairing the transparency of the resultant film or a sealed product thereof.

Among the above, preferred examples of such sealable resins constituting the inner surface layer (c) may include: SSC-LLDPE, SSC-VLDPE, LLDPE, VLDPE, EVA, EMAA, ethylene-methacrylic acid-unsaturated aliphatic carboxylic acid copolymer, and IO resins. A particularly preferred class of SSC-type polyolefins may include those obtained by using a constrained geometry catalyst (a type of metallocene catalyst developed by Dow Chemical Company). The constrained geometry catalyst may provide ethylene-α-olefin copolymers which may be classified as a substantially linear polyethylene resin having ca. 0.01–ca. 3, preferably ca. 0.01–ca. 1, more preferably ca. 0.05–ca. 1, long-chain branching(s) per 1000 carbon atoms. Because of long-chain branches each having ca. 6 or more carbon atoms selectively introduced into its molecular structure, the ethylene-α-olefin copolymer may be provided with excellent physical properties and good formability or processability, and an example thereof is commercially available from Dow Chemical Company under a trade name of "AFFINITY" or "ELITE" (including 1-octene as α-olefin).

Other examples of polyethylene resins obtained by using a metallocene catalyst may include those available under trade names of "EXACT" (EXXON Co.), "UMERIT" (Ube Kosan K.K.), "EVOLUE" (Mitsui Kagaku K.K.), "COLONEL" (Nippon Polychem K.K.) and "HARMOLEX" (Nippon Polyolefin K.K.).

Such a metallocene-catalyzed polyolefin (SSC-polyolefin) may preferably have a polydispersity index defined as a ratio (Mw/Mn) between a weight-average molecular weight (Mw) and a number-average molecular weight (Mn) of below 3, more preferably 1.9–2.2.

The surface layer (c) comprising a sealable resin may preferably have a heat resistance which is lower than that of the surface layer (a). This is because, if the surface layer (c) comprising a sealable resin has a higher heat resistance than the surface layer (a), at the time of applying heat to the film for sealing or deep drawing, the surface layer (a) is liable to be melted in contact with a heating plate to result in a problem regarding the adaptability to sealing or packaging machine or deep drawing processability.

The surface layer (c) comprising a sealable resin can be provided with easy peelability, e.g., in the case of deep drawing packaging. This can be accomplished by using, e.g., a mixture of EMAA and a polypropylene resin, or a mixture of EVA and polypropylene resin.

The heat-shrinkable multilayer film according to the present invention includes the above-mentioned surface layer (a) comprising a thermoplastic resin, intermediate layer (b) comprising a polyamide resin, and surface layer (c) comprising a sealable resin, as its indispensable component layers, but can also include an additional intermediate layer other than the intermediate layer (b) comprising a polyamide resin for the purpose of, e.g., providing the product multilayer film with improved functionality or processability. Examples of such an optional intermediate layer may include the following.

A gas barrier intermediate layer (d), particularly an oxygen gas-barrier layer, comprising a gas barrier resin, examples of which may include: EVOH; aromatic polyamides including an aromatic diamine unit, such as polymethacrylene adipamide (nylon MXD6); and amorphous aromatic polyamides including an aromatic carboxylic acid unit, such as polyhexamethylene isophthalamide/terephthalamide (nylon 6I/6T) which is a copolymer of isophthalic acid, terephthalic acid and hexamethylenediamine.

Another type of preferable intermediate layer may comprise a copolymer of ethylene and at least one species of monomer containing an oxygen atom in its molecule. Specific examples thereof may include: EVA, EMAA, ethylene-methacrylic acid-unsaturated aliphatic carboxylic acid copolymer, EMA, EAA, EBA and IO resin.

Further, a layer of metallocene-catalyzed polyolefin having a density below 0.900 $g/cm_3$ exhibits a good stretch orientation characteristic and may preferably be inserted as an optional intermediate layer for providing a multilayer film having a large heat-shrinkability at a stage after the biaxial stretching.

One or more adhesive resin layers may be inserted as an optional intermediate layer, as desired, e.g., in case where a sufficient adhesion is not ensured between the above-mentioned respective layers. Such an adhesive resin can be selected from those constituting the above-mentioned optional intermediate layers. Further preferred examples of the adhesive resin used for the above purpose may include: EVA, EEA, EAA, acid-modified polyolefins (inclusive of reaction products between olefin homo-or co-polymers and unsaturated carboxylic acids, such as maleic acid and fumaric acid, acid anhydrides, esters or metal salts of these acids, such as acid-modified VLDPE, acid modified LLDPE and acid-modified EVA). It is particularly suitable to use a polyolefin resin modified with an acid such as maleic acid or an anhydride thereof.

Into any one or more of the above-mentioned layers, it is possible to add an additive, such as a lubricant or an antistatic agent.

Examples of the lubricant may include: hydrocarbon lubricants, fatty acid lubricants, fatty acid amide lubricants, ester lubricants and metallic soaps. The lubricants may be liquid or solid. Specific examples of the hydrocarbon lubricants may include: liquid paraffin, natural paraffin, polyethylene wax and micro-crystalline wax. Fatty acid lubricants may include stearic acid and lauric acid. Fatty acid amide lubricants may include: stearic acid amide, palmitic acid amide, N-oleyl-palmitic acid amide, behenic acid amide, erucic acid amide, arachidic acid amide, oleic acid amide, methylene-bis-stearoyl amide, and ethylene-bis-stearoyl amide. Ester lubricants may include butyl stearate, hardened castor oil, ethylene glycol monostearate, and stearic acid mono-glyceride. Metallic soaps may be derived from fatty acids having 12–30 carbon atoms and may include zinc stearate and calcium stearate as representative examples. Among these, fatty acid amide lubricants and metallic soaps may be preferred because of good compatibility with a thermoplastic resin, particularly a polyolefinic resin. Specifically preferred examples of lubricants may include behenic acid amide, oleic acid amide and erucic acid amide. These lubricants may preferably be added in the form of a master batch. Such a master batch containing, e.g., 5–20 wt. % of a lubricant, may preferably be added in an amount sufficient to provide a concentration of 0.05–2 wt. % of the lubricant in a resin layer concerned.

The antistatic agent may preferably be a surfactant, which may be any of anionic surfactants, cationic surfactants, nonionic surfactants, amphoteric surfactants and mixtures of these. The anti-static agent may preferably be added in a proportion of 0.05–2 wt. %, more preferably 0.1–1 wt. % of a resin layer to which it is added.

Preferred examples of layer structure of the stretch-oriented multilayer film according to the present invention are shown below. These are however not exhaustive.

(1) polyester resin/adhesive resin/polyamide resin/adhesive resin/sealable resin,
(2) polyester resin/adhesive resin/polyamide resin/gas barrier resin/adhesive resin/sealable resin,
(3) polyester resin/adhesive resin/polyamide resin/adhesive resin/gas barrier resin/adhesive resin/sealable resin, (4) polyester resin/adhesive resin/polyamide resin/adhesive resin/gas barrier resin/adhesive resin/polyamide resin/adhesive resin/sealable resin, (5) polyester resin/adhesive resin/polyamide resin/gas barrier resin/polyamide resin/adhesive resin/ sealable resin, (6) polyolefin resin/adhesive resin/polyamide resin/adhesive resin/sealable resin, (7) polyolefin resin/adhesive resin/polyamide resin/gas barrier resin/adhesive resin/sealable resin, (8) polyolefin resin/adhesive resin/polyamide resin/adhesive resin/gas barrier resin/adhesive resin/ sealable resin, (9) polyolefin resin/adhesive resin/polyamide resin/adhesive resin/gas barrier resin/adhesive resin/polyamide resin/adhesive resin/sealable resin, and

(10) polyolefin resin/adhesive resin/polyamide resin/gas barrier resin/polyamide resin/adhesive resin/sealable resin.

The stretch-oriented multilayer film may preferably be formed by laminating the above-mentioned layers, followed by stretching and relaxation into a final form of multilayer film having a total thickness of 20–250 μm, particularly 40–150 μm. Further, in the case of packaging rib (meat) retaining a sharp-cut bone and requiring an especially high pinhole resistance, the total thickness may preferably be 60–250 μm, particularly 90–150 μm.

More specifically, it is preferred that the surface layer (a) comprising a thermoplastic resin has a thickness of 0.5–25 μm, particularly 1–15 μm, the intermediate layer (b) comprising a polyamide resin has a thickness of 3–50 μm, particularly 10–40 μm, and the surface layer (c) comprising a sealable resin has a thickness of 10–150 μm, particularly 15–60 μm. Particularly, in the case where the surface layer (a) comprises a polyester resin, it is preferred that the layer (a) has a thickness smaller than that of the layer (b), more specifically a thickness of 3–70%, particularly 6–50%, of that of the layer (b), in order to provide the multilayer film with a properly harmonized biaxial stretchability.

The optionally disposed gas barrier layer (d) may have a thickness of, e.g., 1–30 μm, preferably 2–15 μm. Below 1 μm, the oxygen gas barrier-improving effect may be scarce, and above 30 μm, the extrusion of the layer and the stretching and processing of the multilayer film become difficult.

The adhesive resin layer can be disposed in a plurality of layers, each having a thickness in the range of suitably 0.5–5 μm.

The stretch-oriented multilayer film may be formed by first forming a yet-unstretched film by co-extrusion through a plurality of extruders and then biaxially stretching the film by a known process, such as the tenter process, followed by a high degree of relaxation heat treatment at a relaxation ratio of at least 20% in at least one axial direction. The stretching ratio may preferably be 2.5–4 times in both longitudinal and transverse directions. The thus-formed stretch-oriented multilayer film can also be laminated with another resin layer according to a known lamination process.

The stretch-oriented multilayer film may preferably be formed through inflation according to the process of the present invention. A preferred embodiment thereof is described with reference to FIG. 1, the sole figure in the drawing.

A number of extruders 1 (only one being shown) are provided corresponding to the number of laminated resin species, and the respective resins from the extruders are co-extruded through an annular die 2 to form a tubular product (parison) 3 including at least three layers of an outer surface layer (a) comprising a thermoplastic resin, an intermediate layer (b) comprising a polyamide resin and an inner surface layer (c) comprising a sealable resin. The parison 3 is then vertically pulled down into a water bath 4 and taken up by pinch rollers 5 while being cooled down to a temperature that is below the lowest one of the melting points of the principal resins constituting the respective resin layers (i.e., the thermoplastic resin, the polyamide resin and the sealable resin), preferably to 40° C. or below. The thus-taken-up tubular film 3a, while optionally introducing an opening aid such as soybean oil thereinto as desired, is introduced into a bath 6 of warm water at, e.g., 80–95° C., which is at most the lowest one of the meting points of the principal resins constituting the respective layers, and the thus-warmed tubular film 3b is pulled upwards to form a bubble of tubular film 3C with fluid air introduced between pairs of pinch rollers 7 and 8, whereby the tubular film 3C is biaxially stretched simultaneously at a ratio of preferably 2.5–4 times, more preferably 2.8–4 times, in each of vertical or machine direction (MD) and transverse or lateral direction (TD), most preferably at 2.9–3.5 times (MD) and 3–3.5 times (TD), while cooling the film 3C with cool air at 10–20° C. from a cooling air ring 9. The thus biaxially stretched film 3d is once folded or laid flat and then pulled downwards to again form a bubble of tubular film 3e with fluid air introduced between pairs of pinch rollers 10 and 11. The bubble of tubular film 3e is held within a heat-treating tube 12 wherein steam from blowing ports 13 is blown (or warm water from spraying ports is sprayed) against the tubular film 3e to heat-treat the tubular film 3e after the biaxial stretching at 70–98° C., preferably 75–95° C., for ca. 1–20 sec., preferably ca. 1.5–10 sec., thereby allowing the tubular film to relax by 15–40% (but at least 20% in at least one direction), preferably 20–35%, in each of the machine direction (MD) and the transverse direction (TD). A tubular film 3f after the heat-treatment corresponds to a stretch-oriented multilayer film according to the present invention and is wound about a take-up or winding roller 14.

Again to say, in order to realize improvements in various properties represented by an improved low-temperature impact resistance while retaining excellent strengths, it is extremely preferred to adopt a combination of high degree of stretching and high degree of relaxation treatment, i.e., to ensure high stretching ratios of 2.5–4 times, more preferably 2.8–3.5 times, in both MD/TD, most preferably 2.9–3.5 times, in MD and 3–3.5 times in TD and then to effect a heat-treatment for causing relaxation by 15–40% in each of MD/TD (but at least 20% in at least one direction), preferably by 20–30% in each of MD/TD, with steam or warm water as a heating medium having a large heat capacity. At a lower stretching ratio, it is difficult to attain necessary film strengths after the heat treatment, and the resultant film is liable to have thickness irregularity, thus failing to exhibit satisfactory packaging performance. On the other hand, in the case of using a heating medium having a small heat capacity, such as hot air, or adopting a lower heat treatment temperature of below 70° C., it becomes difficult to realize a sufficiently large degree of relaxation, thus being liable to fail in realizing a necessary improvement in low-temperature impact resistance. On the contrary, if the heat treatment is effected at a higher temperature exceeding 100° C., the sealable resin layer (c) comprising, e.g., a polyolefin, is liable to be melted, whereby the orientation of the layer (c) is removed, thus being liable to fail in providing excellent strength. If the relaxation percentage is below 15% at the time of the heat treatment, it is difficult to realize a sufficient degree of orientation relaxation at the amorphous portion as represented by a desired low-temperature impact resistance. Above 40%, the resultant film is liable to be wrinkled.

The thus-obtained stretch-oriented multilayer film according to the present invention retains a high degree of basic strength represented by a tensile strength as a result of the high degree of stretching of the polyamide resin layer and is also provided with a remarkably improved low-temperature impact resistance represented by an impact energy at −10° C. Further, accompanying the increase in low-temperature impact resistance, the film has been also provided with remarkable improvements in piercing strength, anti-pinhole property, deep drawing characteristic, etc. Through the high degree of relaxation heat treatment, the heat-shrinkability of the product multilayer film is naturally lowered. Thus, the stretch-oriented multilayer film of the present invention does not include a heat-shrinkability as an essential property but may preferably retain a certain degree of hot-water shrinkability depending on the use thereof since such a degree of hot water shrinkability provides an improved appearance by preventing the occurrences of winkles of a packaged product.

Examples of appropriate degrees of hot-water shrinkability (at 90° C.) for specific packaging materials may include: 0–20%, more preferably 0–15%, for freeze packaging material; 0–25%, more preferably 0–15%, for deep drawing packaging material; 5–20%, more preferably 5–15%, for tray packaging lid material; and below 15%, more preferably below 10% (below 15%, more preferably below 10% in terms of dry heat-shrinkability at 120° C.) for vertical pillow packaging material. Such a level of hot-water shrinkability of a product stretch-oriented multilayer film can be controlled within an extent of retaining necessary low-temperature impact resistance by adjusting the relaxation percentage (within an extent of ensuring at least 20% in at leas one direction) in connection with the preceding stretching ratio.

In order to provide a freeze-packaged product or a packaged product for cold circulation around 5° C. (or 0–10° C.) with an improved pinhole resistance, the stretch-oriented multilayer film of the present invention may preferably show an actual impact resistance (i.e., not a normalized impact resistance at a thickness of 50 μm) of at least 1.6 Joule at −10° C.

Particularly in the case of packaging of rib (meat) retaining a sharp-cut bone and requiring an especially high pinhole resistance, the multilayer film may preferably show an actual impact resistance (as measured at −10° C.) of at least 3 Joule, more preferably at least 4 Joule, further preferably at least 5 Joule, so as to allow the packaging without using a bone guard (reinforcing material) ordinarily used for such packaging.

In the above-described stretch-oriented multilayer film production process according to the present invention, the multilayer film before or after the stretching may be exposed to radiation. By the exposure to radiation, the product multilayer film may be provided with improved heat resistance and mechanical strength. Because of a moderate crosslinking effect thereof, the exposure to radiation can exhibit an effect of providing improved film formability by stretching and improved heat resistance. In the present invention, known radiation, such as α rays, β rays, electron beams, γ rays, or X rays may be used. In order to provide an adequate level of crosslinking effect, electron rays and γ rays are preferred, and electron beams are particularly preferred in view of facility of handling and high processing capacity in producing the objective multilayer film.

The conditions for the above exposure to radiation may be appropriately set depending on the purpose thereof, such as a required level of crosslinkage. For example, it is preferred to effect the electron beam exposure at an acceleration voltage in the range of 150–500 kilo-volts to provide an absorbed dose of 10–200 kGy (kilo-gray) or effect γ-ray exposure at a dose rate of 0.05–3 kGy/hour to provide an absorbed dose of 10–200 kGy.

It is also possible that the inner surface or/and the outer surface of the stretch-oriented multilayer film of the present invention are subjected to corona discharge treatment, plasma treatment or flame treatment.

The stretch-oriented multilayer film of the present invention has a remarkably improved low-temperature impact resistance and is particularly suitable for use as a freeze packaging material. However, the presumably-caused extreme orientation relaxation at the amorphous portion represented by the improved low-temperature impact resistance in combination with the high degree of orientation of the crystalline portion has resulted in softness and improvements in piecing strength, etc., which have not been achieved heretofore. As a result, the stretch-oriented multilayer film of the present invention is also extremely suitable for use as, e.g., deep drawing packaging material, vertical pillow packaging material, tray packaging lid material, and packaging material for cold or refrigeration circulation or freeze packaging material for rib (meat), fish meat and marine products such as crabs, for which the above-mentioned properties are particularly desired.

EXAMPLES

Hereinbelow, the present invention will be described more specifically based on Examples and Comparative Examples. It should be noted however that the scope of the present invention is not restricted by such Examples. Some physical properties described herein are based on values measured according to the following methods.

<Physical Property Measurement Methods>

1. Impact Strength and Energy

Measured at −10° C. according to ASTM D3763-86 by using "DROP-WEIGHT TESTER RTD-5000" (available from Rheometrics, Inc.)

More specifically, in an environment of −10° C., a sample of stretch-oriented multilayer film cut into a square of 10 cm×10 cm is disposed horizontally and sandwiched between a pair of clamps each having a 3.8 cm-dia. circular opening with its surface layer (a) directed upwards. Onto the sample film at the opening, a plunger of 4 kg in weight and having a hemispherical tip portion of 1.27 cm in diameter is dropped at a speed of 333.33 cm/sec to measure a load applied to the dropping plunger and a displacement by a sensor, from which a displacement-load curve is obtained. Based on the curve, a maximum load until the breakage is read as an impact strength ($F_{IP}$ (N)), and an energy absorbed by the film until the breakage is calculated to obtain an impact energy ($E_{IP}$ (J)). Five sample films from each product film are subjected to the above measurement, and the average values are taken as measured values.

Based on the above-measured impact energy ($E_{IP}$ (J)) for a sample having a thickness t (μm), an impact energy normalized at a thickness of 50 μm ($E_{IP50}$ (J)) is calculated according to the following equation:

$$E_{IP50}(J) = E_{IP}(J) \times (50/t).$$

2. Piercing Strength

In an environment of 23° C. and 50% RH, a piercing pin having a hemispherical tip having a radius of curvature of 0.5 mm attached to a tensile tester ("TENSILON RTM-100", available from Orientec K.K.) is caused to pierce a sample multilayer film from its surface layer (a) side at a speed of 50 mm/min, thereby measuring a maximum value of force applied to the film until the breakage thereof as a piercing strength ($F_p$ (N)).

3. Hot-water Shrinkability

A sample film on which marks are indicated at a distance therebetween of 10 cm in each of a machine direction (MD) and a transverse direction (TD) perpendicular to the machine direction, is dipped for 10 sec. in hot water adjusted at 90° C. and then taken out therefrom, followed by immediate quenching within water at room temperature. Thereafter, the distance between the marks is measured and a decrease in distance is indicated in percentage of the original distance 10 cm. Five sample films from each product film are subjected to the above measurement, and the average value of percentage decrease is indicated in each of the MD and TD.

4. Dry heat-Shrinkability

A 3 mm-thick corrugated board is placed on a rack, and a Geer oven ("Model MOG-600", available from K. K. Robert) is placed thereon and heated to a prescribed temperature. Into the oven, a sample film on which marks are indicated at a distance therebetween of 10 cm in each of MD and TD is placed. In this instance, the door of the oven is immediately closed after the placement of the sample film so that the door opening period is restricted to be within 3 minutes. After the door closure, the sample film is left standing for 30 sec in the Geer oven and then taken out for natural cooling. Thereafter, the distance between the marks on the sample film is measured, and a decrease in distance is indicated in percentage of the original distance 10 cm. Five sample films from each product film are subjected to the above measurement, and the average value of percentage decrease is indicated in each of the MD and TD.

Film Production Examples

Next, Examples and Comparative Examples for production of stretch-oriented multilayer films are described. Resins used in the following productions examples are inclusively shown in Table 1 together with their abbreviations.

Example 1

By using an apparatus having an arrangement as roughly shown in FIG. 1, a tubular laminate product (parison) having a laminar structure from the outer to the inner layers of PET (3)/mod-VL (2)/NY-1(13)/EVOH (4)/mod-VL (2)/LLDPE (31) with thickness ratios of respective layers indicated in the parentheses was co-extruded by extruding the respective resins through a plurality of extruders 1 (only one being shown) respectively and introducing the melted resins to an annular die 2 to melt-bond the respective layers in the above-described order. The molten parison 3 extruded out of the die 2 was quenched to 10–18° C. by a water bath 4 to form a flat tubular product 3a. Then, the flat tubular product 3a was passed through a warm water bath 6 at 92° C. and formed into a bubble-shaped tubular film 3c, which was then biaxially stretched at ratios of 3.4 times in MD and 3.4 times in TD by the inflation process while being cooled with cooling air at 15–20° C. from an air ring 9. Then, the biaxially stretched film 3d was guided into a 2 meter-long heat-treating tube 12 to form a bubble-shaped tubular film 3e, which was then heat-treated for 2 sec. with steam at 90° C. blown out of steam blowing ports 13, while being allowed to relax by 20% in MD direction and by 20% in TD direction, thereby providing a biaxially stretched film (stretch-oriented multilayer film) 3f. The thus-obtained multilayer film exhibited a lay-flat width of 490 mm and a thickness of 55 μm.

The laminate structure, film production (stretching-relaxation) conditions, physical properties and packaging performances of the thus-obtained multilayer film are inclusively shown in Tables 2 to 5 together with those of multilayer films obtained in other Examples and Comparative Examples.

Examples 2–15 and Comparative Examples 1, 2, 4, 5 and 7

Various multilayer films were prepared in similar manners as in Example 1 except that the laminar structures and film production (stretching-relaxation) conditions were respectively changed as shown in Tables 2 to 4.

Comparative Example 3

A commercially available 15 μm-thick stretched film of nylon 6 (O-Ny 6) and a commercially available 60 μm-thick unstretched film of ethylene-vinyl acetate copolymer (EVA) was applied to each other to form a composite film.

Comparative Example 6

Respective resins were melt-extruded from a plurality of extruders and the melt-extruded resins were introduced into a T-die to be melt-bonded so as to provide a laminar structure and thickness ratios as shown in Table 4, thereby forming a co-extruded unstretched film.

Each of the multilayer films obtained in the above Examples and Comparative Examples was subjected to the above-mentioned measurement of physical properties and performance evaluation tests described hereinafter. The results are inclusively shown in Tables 2 to 5 described hereinafter.

<Performance Evaluation Tests>

1. Hot Fill Performance

A 200 mm-wide and 400 mm-long pouch was formed from a sample film, and a hot water of ca. 70° C. was poured thereinto to evaluate the hot fill performance according to the following standard:

A: A shrinkage after the pouring of hot water was at most 5%, thus showing adaptability to hot filling.

C: A shrinkage after the pouring of hot water exceeded 5%, thus showing non-adaptability to hot filling.

2. Anti-pinhole Property

Each product film of Examples and Comparative Examples were formed into bags of 220 mm-width and 450 mm-length (inner sizes). Into each bag, a frozen tuna cut piece (with skin) of 800 g cooled to −50° C. was vacuum-packaged in an environment of ca. 15° C. to obtain a packaged product. Twenty packaged product samples were prepared from each product film and packed into two foam styrol boxes (size: 390 mm-L×330 mm-W×260 mm-H) together with dry ice so that each box contained 10 packaged product samples together with dry ice. The boxes were transported on an truck from Shizuoka prefecture to Ibaraki prefecture (over a distance of ca. 300 kilometers). Then, the packaged product samples were checked with respect the presence or absence of pinholes, and the percentage of broken bag was calculated by [(number of bags with pinholes)/20]×100, whereby each product film was evaluated based on the broken bag percentage according to the following standard.

A: No bags with pinholes (Broken bag percentage=0%)
B: Broken bag percentage ≦5%
C: Broken bag percentage exceeded 5%, thus showing a problem in practical utility.

The occurrence of pinholes showed a clear correlation with the low-temperature impact resistance and the piercing strength, and the product films of Examples showed remarkably better anti-pinhole property than the laminate film including a substantially identical thickness of nylon layer (Comparative Example 3).

3. Vertical pillow packaging performance

Each sample film was evaluated with respect to a vertical pillow packaging performance by using a vertical pillow packaging machine ("ONPACK 207 SG", made by Orihiro K. K.) used for packing a liquid or powdery product by intermittent packaging operation. For the test, 1 kg of water at room temperature was packed under the conditions of a longitudinal seal temperature of 160° C., a transverse seal temperature of 170° C. and a film cut length of 280 mm.

The packaging performance was evaluated with respect to coming-off of the film and sticky adhesion onto a seal bar according to the following standard.

(Film Coming-off)
A: Continuous packaging was possible
C: The film came off the seal bar due to shrinkage, thus failing to achieve continuous packaging.

(Sticky Adhesion onto a Seal Bar)
A: Continuous packaging was possible without causing sticky adhesion of the film onto the seal bar.
C: Continuous packaging was impossible due to sticky adhesion of the film during the packaging operation.

4. Deep Drawing Performance (Base Sheet)

A deep drawing packaging test was performed by using each sample film as a base sheet together with the film of Example 3 as a lid material by means of a deep drawing packaging machine ("FV-603", made by Ohmori Kikai Kogyo K. K.), wherein each sample film as a base sheet was deeply drawn at 100° C. by using a disk-shaped mold of 98 mm in diameter and 30 mm in depth (except that a mold of 60 mm in depth was used in Example 14). The evaluation was performed with respect to the following items.

(1) Formability
A: Formable without breakage
C: Deep drawing was impossible due to breakage (2) Hot-water Shrinkability and Piercing Strength at the Drawn Corner.
A hot-water shrinkability and a piercing strength (N) were measured with respect to the drawn corner of a formed base sheet sample.

(3) Wrinkles after Boiling
A packaged product of indefinitely shaped roasted pig meat was dipped in hot water at 90° C. for 10 sec., and then the presence or absence of wrinkles on the package surface was checked.
A: The packaged product surface was free from wrinkles and exhibited a beautiful appearance.
C: The packaged product surface showed wrinkles, thus lowering the commercial value.

(4) Abuse Test
Crylichical rubber sheets (weight=ca. 60 g/sheet) each having a thickness of 5 mm and a diameter of 98 mm were packed to provide packaged products each containing 5 rubber sheets. The packaged product samples were placed in a hexagonal tube box (which was supported rotatably about a shaft extending horizontally to pierce the centers of two mutually parallel hexagonal sides of the box) and subjected to a 6-angle rotation test (abuse test) for 10 min. in an environment of 5° C. The packaged product samples after the test were subjected to measurement of pinhole percentage.

(5) Rib (Meat) Packaging Test
Beef rib retaining a sharp-cut back bone was vacuum-packaged with sample film bags to form 20 package product samples, and the packaged product samples were dipped for 1 sec. in hot water at 90° C. to be shrinked. Thereafter, the packaged products were subjected to a circulation test at 5° C. and then checked with respect to the occurrence of pinholes. The evaluation was performed according to the following standard.
A: The pinhole percentage was 5% or below.
C: The pinhole percentage substantially exceeded 5%.

TABLE 1

| | Component Resins | | | |
|---|---|---|---|---|
| Abbreviation | Resin | Maker (Trade name) | Crystal melting point (° C.) | Remarks ** |
| Ny-1 | nylon 6–66 copolymer (wt. ratio = 80:20) | Mitsubishi Engineering Plastic K.K. (NOVAMID 2430A1) | 195 | $\eta_{rel} = 4.5$ |
| Ny-2 | nylon 6–69 copolymer | EMS Co. (GRILON BM13SBG) | 134 | |
| Ny-3 | nylon 6I–6T copolymer | EMS Co. (GRIVORY G21) | — | |
| PET | ethylene terephthalate-isophthalate copolymer *1 | Kanebo K.K. (BELPET IFG-8L) | 228 | $\eta_{int} = 0.80$ |
| EVOH | saponified ethylene-vinyl acetate copolymer (ethylene content = 48 mol %) | Kuraray K.K. (EVAL EPG156B) | 160 | MFR = 6.5 g/10 min. |
| VLDPE | ethylene-hexene copolymer (d = 0.908 g/cm³) | Sumitomo Kagaku K.K. (SMIKASEN C53009) | 119 | MFR = 3.0 g/10 min. |
| LLDPE | ethylene-octene copolymer (d = 0.916 g/cm³) | Idemitsu Sekiyu Kagaku K.K. (MORETEC 0238CN) | 122 | MFR = 2.0 g/10 min. |

TABLE 1-continued

Component Resins

| Abbreviation | Resin | Maker (Trade name) | Crystal melting point (° C.) | Remarks ** |
|---|---|---|---|---|
| SVL | ethylene-octene copolymer *2 (d = 0.902 g/cm³) | Dow Chemical Co. (AFFINITY PL1880) | 100 | MFR = 1.0 g/10 min. |
| mod-VL | modified very low density polyethylene *3 | Mitsui Kagaku K.K. (ADMER SF730) | — | MFR = 2.7 g/10 min. |

*1: Acid is a mixture of 12 mol % isophthalic acid and 88 mol % terephthalic acid.
*2: Polymerized in the presence of a metallocene catalyst.
*3: Modified with an unsaturated carboxylice acid.
**: $\eta_{rel}$ = relative viscosity, $\eta_{int}$ = intrinsic viscosity, MFR = inlet flow rate.

TABLE 2

Freeze-packaging & Vertical pillow packaging (1)

| Ex. & Comp. Ex. | Ex. 1 | | Ex. 2 | | Ex. 3 | | Ex. 4 | |
|---|---|---|---|---|---|---|---|---|
| Film structure | | | | | | | | |
| 1st thickness (μm) | PET | 3 | PET | 2 | PET | 2 | PET | 3 |
| 2nd | mod-VL | 2 | mod-VL | 2 | mod-VL | 2 | mod-VL | 1.5 |
| 3rd | Ny-1 | 13 | Ny-1 | 12 | Ny-1 | 14 | Ny-1 | 12 |
| 4th | EVOH | 4 | EVOH | 4 | EVOR | 9 | EVOH | 4 |
| 5th | mod-VL | 2 | mod-VL | 2 | mod-VL | 2 | mod-VL | 1.5 |
| 6th | LLDPE | 31 | LLDPE | 32 | LLDPE | 35 | LLDPE | 18 |
| total (μm) | | 55 | | 54 | | 64 | | 40 |
| Stretch ratio MD | | 3.4 | | 3 | | 3 | | 3 |
| TD | | 3.4 | | 3 | | 3 | | 3.2 |
| Relaxation heating | | | | | | | | |
| Temp. (° C.) | | 90 | | 90 | | 90 | | 90 |
| Percentage (%) MD | | 20 | | 25 | | 15 | | 20 |
| TD | | 20 | | 25 | | 27 | | 20 |
| (Film properties) | | | | | | | | |
| Piercing strength (N) | | 28 | | 23 | | 27 | | 23 |
| Impact strength (N) | | 307 | | 214 | | 291 | | 241 |
| Impact energy (J) measured | | 2.7 | | 2.0 | | 2.2 | | 2.2 |
| at 50 μm | | 2.5 | | 1.8 | | 1.7 | | 2.8 |
| Hot water shrink (%) MD | | 11 | | 12 | | 10 | | 8 |
| 90° C. TD | | 15 | | 8 | | 8 | | 12 |
| Dry shrink (%) MD | | 10 | | 7 | | 6 | | 5 |
| 120° C. TD | | 14 | | 5 | | 4 | | 6 |
| (Freeze packaging) | | | | | | | | |
| Hot fill | | A | | A | | A | | A |
| Anti-pinhole | | A | | B | | A | | A |
| Broken bag percentage | | 0% | | 5% | | 0% | | — |
| (Pillow packaging) | | | | | | | | |
| Film coming-off | | — | | — | | — | | — |
| Sticking to seal bar | | — | | — | | — | | — |

| Ex. & Comp. Ex. | Ex. 5 | | Ex. 6 | | Ex. 7 | | Ex. 8 | |
|---|---|---|---|---|---|---|---|---|
| Film structure | | | | | | | | |
| 1st thickness (μm) | PET | 2 | LLDPE | 5 | PET | 3 | PET | 3 |
| 2nd | mod-VL | 2 | mod-VL | 1.5 | mod-VL | 2 | mod-VL | 2 |
| 3rd | Ny-1 | 12 | Ny-1 | 14 | Ny-1 | 14 | Ny-1 | 16 |
| 4th | EVOH | 4 | EVOH | 4 | EVOH | 4 | EVOH | 4 |
| 5th | mod-VL | 2 | mod-VL | 1.5 | mod-VL | 2 | mod-VL | 2 |
| 6th | LLDPE | 30 | SVL | 20 | LLDPE | 34 | VLDPE | 40 |
| total (μm) | | 52 | | 46 | | 59 | | 67 |
| Stretch ratio MD | | 3.2 | | 3.2 | | 3.2 | | 3.2 |
| TD | | 3.2 | | 3.2 | | 3.2 | | 3.2 |
| Relaxation heating | | | | | | | | |
| Temp. (° C.) | | 90 | | 90 | | 95 | | 90 |
| Percentage (%) MD | | 20 | | 20 | | 28 | | 25 |
| TD | | 20 | | 20 | | 35 | | 30 |

TABLE 2-continued (Film properties)

| | | | | |
|---|---|---|---|---|
| Piercing strength (N) | 22 | 18 | 18 | 19 |
| Impact strength (N) | 257 | 193 | 214 | 228 |
| Impact energy (J) measured | 2.3 | 1.8 | 1.9 | 2.3 |
| at 50 μm | 2.2 | 2.0 | 1.6 | 1.7 |
| Hot water shrink (%) MD | 8 | 6 | 2 | 6 |
| 90° C. TD | 12 | 10 | 3 | 9 |
| Dry shrink (%) MD | 5 | 6 | 4 | 3 |
| 120° C. TD | 7 | 8 | 4 | 4 |
| (Freeze packaging) | | | | |
| Hot fill | — | A | A | A |
| Anti-pinhole | — | B | A | A |
| Broken bag percentage | — | 5% | 0% | 0% |
| (Pillow packaging) | | | | |
| Film coming-off | A | — | A | A |
| Sticking to seal bar | A | — | A | A |

TABLE 3

Freeze-packaging & Vertical pillow packaging (2)

| Ex. & Comp. Ex. | Ex. 9 | | Ex. 10 | | Comp. Ex. 1 | | Comp. Ex. 2 | | Comp. Ex. 3 | | Comp. Ex. 4 | | Comp. Ex. 5 | |
|---|---|---|---|---|---|---|---|---|---|---|---|---|---|---|
| Film structure | | | | | | | | | | | | | | |
| 1st thickness (μm) | PET | 2 | PET | 2 | PET | 1.5 | LLDPE | 3 | O-Ny6 | 15 | PET | 4 | Ny-1 | 10 |
| 2nd | mod-VL | 2 | mod-VL | 2 | mod-VL | 1.5 | mod-VL | 1.5 | EVA | 60 | mod-VL | 1.5 | mod-VL | 2 |
| 3rd | Ny-1 | 14 | Ny-1 | 11 | Ny-1 | 8 | Ny-1 | 12 | | | Ny-1 | 20 | EVOH | 3 |
| 4th | EVOH | 4 | EVOH | 4 | EVON | 5 | EVON | 4 | | | EVOH | 3 | TPU | 3 |
| 5th | mod-VL | 2 | mod-VL | 2 | mod-VL | 1.5 | mod-VL | 1.5 | | | mod-VL | 1.5 | mod-VL | 2 |
| 6th | LLDPE | 44 | LLDPE | 40 | LLDPE | 21 | LLDPE | 20 | | | VLDPE | 50 | VLDPE | 20 |
| total (μm) | 68 | | 61 | | 38.5 | | 42 | | 75 | | 80 | | 42 | |
| Stretch ratio MD | 3.2 | | 3.2 | | 3.1 | | 3 | | | | 2.4 | | 2.9 | |
| TD | 3.2 | | 3.2 | | 3.2 | | 3.2 | | | | 2.8 | | 2.8 | |
| Relaxation heating | | | | | | | | | | | | | | |
| Temp. (° C.) | 90 | | 90 | | 70 | | 90 | | | | 70 | | none | |
| Percentage (%) MD | 25 | | 25 | | 10 | | 15 | | | | 10 | | none | |
| TD | 25 | | 25 | | 10 | | 15 | | | | 10 | | none | |
| (Film properties) | | | | | | | | | | | | | | |
| Piercing strength (N) | 20 | | 19 | | 17 | | 17 | | 14 | | 22 | | 15 | |
| Impact strength (N) | 239 | | 218 | | 160 | | 160 | | 143 | | 225 | | 176 | |
| Impact energy (J) measured | 2.2 | | 1.9 | | 0.9 | | 1.0 | | 0.8 | | 1.5 | | 1.2 | |
| at 50 μm | 1.6 | | 1.6 | | 1.2 | | 1.2 | | 0.5 | | 0.9 | | 1.4 | |
| Hot water shrink (%) MD | 9 | | 7 | | 28 | | 10 | | 0 | | 17 | | 34 | |
| 90° C. TD | 13 | | 13 | | 30 | | 8 | | 0 | | 24 | | 30 | |
| Dry shrink (%) MD | 4 | | 4 | | 21 | | 6 | | 0 | | — | | — | |
| 120° C. TD | 7 | | 7 | | 23 | | 6 | | 0 | | — | | — | |
| (Freeze packaging) | | | | | | | | | | | | | | |
| Hot fill | — | | — | | C | | A | | A | | — | | — | |
| Anti-pinhole | — | | — | | C | | C | | C | | — | | — | |
| Broken bag percentage | — | | — | | 30% | | 30% | | 60% | | — | | — | |
| (Pillow packaging) | | | | | | | | | | | | | | |
| Film coming-off | A | | A | | C | | A | | — | | — | | — | |
| Sticking to seal bar | A | | A | | A | | C | | — | | — | | — | |

TABLE 4

Deep drawing

| Ex. & Comp. Ex. | Ex. 11 | | Ex. 12 | | Ex. 13 | | Comp. Ex. 1 | | Comp. Ex. 6 | | Comp. Ex. 7 | | Ex. 14 | |
|---|---|---|---|---|---|---|---|---|---|---|---|---|---|---|
| Film structure | | | | | | | | | | | | | | |
| 1st thickness (μm) | PET | 2 | PET | 2 | PET | 2 | PET | 1.5 | Ny-1 | 22 | LLDPE | 3 | PET | 3 |
| 2nd | mod-VL | 2 | mod-VL | 2 | mod-VL | 2 | mod-VL | 1.5 | mod-VL | 10 | mod-VL | 1.5 | mod-VL | 2 |
| 3rd | Ny-1 | 13 | Ny-1 | 15 | Ny-1 + Ny-2 = 50 + 50 wt % | 12 | Ny-1 | 8 | EVOH | 14 | Ny-1 | 12 | Ny-1 | 16 |
| 4th | EVOH | 7 | EVOH | 9 | EVON | 4 | EVON | 5 | Ny-1 | 44 | EVOH | 4 | EVOH | 8 |
| 5th | mod-VL | 2 | mod-VL | 2 | mod-VL | 1.8 | mod-VL | 1.5 | mod-VL | 10 | mod-VL | 1.5 | mod-VL | 2 |
| 6th | LLDPE | 30 | LLDPE | 35 | LLDPE | 30 | LLDPE | 21 | LLDPE | 101 | LLDPE | 18 | LLDPE | 40 |
| total (μm) | | 56 | | 65 | | 52 | | 38.5 | | 200 | | 40 | | 71 |
| Stretch ratio MD | | 2.9 | | 3 | | 3.6 | | 3.1 | | none | | 3 | | 3.2 |
| TD | | 3 | | 3 | | 3.2 | | 3.2 | | none | | 3.2 | | 3.2 |
| Relaxation heating | | | | | | | | | | | | | | |
| Temp. (° C.) | | 90 | | 90 | | 90 | | 70 | | none | | 90 | | 95 |
| Percentage (%) MD | | 20 | | 15 | | 20 | | 10 | | none | | 15 | | 30 |
| TD | | 20 | | 27 | | 20 | | 10 | | none | | 15 | | 32 |
| (Film properties) | | | | | | | | | | | | | | |
| Piercing strength (N) | | 21 | | 27 | | 20 | | 17 | | | | 17 | | 20 |
| Impact strength (N) | | 238 | | 291 | | 214 | | 160 | | | | 160 | | 250 |
| Impact energy (J) measured at 50 μm | | 2.0 | | 2.2 | | 1.8 | | 0.9 | | | | 1.0 | | 2.3 |
| | | 1.8 | | 1.7 | | 1.7 | | 1.2 | | | | 1.3 | | 1.6 |
| Hot water shrink (%) MD | | 7 | | 10 | | 12 | | 28 | | 0 | | 10 | | 3 |
| 90° C. TD | | 13 | | 8 | | 15 | | 30 | | 0 | | 8 | | 5 |
| (Deep drawing (base sheet)) | | | | | | | | | | | | | | |
| Formability | | A | | A | | A | | C | | A | | A | | A |
| Surface gloss | | A | | A | | A | | A | | C | | A | | A |
| Maximum drawn depth | | 24 | | 24 | | 27 | | broken | | 29 | | | | 50 |
| Piercing strength (N) | | 1.8 | | 2.1 | | 1.6 | | | | 1.5 | | | | — |
| Hot water shrink | | 22 | | 19 | | 30 | | | | 5 | | | | — |
| Wrinkles | | A | | A | | A | | | | C | | | | A |
| Abuse test | | 0% | | 0% | | 0% | | | | 0% | | | | 0% |

TABLE 5

Rib (meat) packaging

| Ex. & Comp. Ex. | Ex. 15 | |
|---|---|---|
| Film structure | | |
| 1st thickness (μm) | PET | 4 |
| 2nd | mod – VL | 2.5 |
| 3rd | Ny – 1 + NY – 3 = 80 + 20 wt % | 34 |
| 4th | EVOH | 5 |
| 5th | mod – VL | 2.5 |
| 6th | VLDPE | 80 |
| total (μm) | | 128 |
| Stretch ratio MD | | 2.9 |
| TD | | 3.3 |
| Relaxation heating | | |
| Temp. (° C.) | | 75 |
| Percentage (%) MD | | 25 |
| TD | | 25 |
| (Film properties) | | |
| Piercing strength (N) | | 38 |
| Impact strength (N) | | 440 |
| Impact energy (J) measured at 50 μm | | 5.9 |
| | | 2.3 |
| Hot water shrink (%) MD | | 20 |
| 90° C. TD | | 24 |

TABLE 5-continued

| Rib (meat) packaging | |
|---|---|
| Ex. & Comp. Ex. | Ex. 15 |
| Dry shrink (%) MD 120° C. TD (Rib packaging) | — — |
| Pinhole resistance | A |

INDUSTRIAL APPLICABILITY

As describe above, according to the present invention, it has become possible to produce a stretch-oriented multilayer film including a polyamide resin layer as a principal intermediate layer and having a remarkably improved low-temperature impact resistance while retaining necessary strength through a combination of a high degree of stretching and a high degree of relaxation heat treatment at degrees which have not been exercised heretofore. Accompanying the improvement in low-temperature impact resistance, the stretch-oriented multilayer film is provide with improvements in piercing strength, anti-pinhole property, etc., thus being suitably used not only as a freeze packaging material but also as a deep drawing packaging material, a vertical pillow packaging material, and also a tray packaging lid material.

The invention claimed is:

1. A stretch-oriented multilayer film, comprising at least three layers including a surface layer (a) comprising a thermoplastic resin, an intermediate layer (b) comprising a polyamide resin and a surface layer (c) comprising a sealable resin, said multilayer film exhibiting an impact energy of at least 1.5 Joule at a conversion thickness of 50 μm at −10° C.

2. A multilayer film according to claim 1, exhibiting an actual impact energy at −10° C. of at least 1.6 Joule.

3. A multilayer film according to claim 1, wherein the surface layer (a) has a larger heat resistance than the surface layer (c).

4. A multilayer film according to claim 1, wherein the intermediate layer (b) has a larger thickness than the surface layer (a).

5. A multilayer film according to claim 1, wherein the surface layer (a) comprises a stretch-oriented polyester resin.

6. A multilayer film according to claim 1, having a heat-shrinkability.

7. A multilayer film according to claim 6, having a hot-water shrinkability at 90° C. of below 20%.

8. A multilayer film according to claim 6, having a hot-water shrinkability at 90° C. of below 15%.

9. A freeze-packaging material, comprising a stretch-oriented multilayer film according to claim 1.

10. A vertical pillow-packaging material, comprising a stretch-oriented multilayer film according to claim 1.

11. A deep drawing-packaging material, comprising a stretch-oriented multilayer film according to claim 1.

12. A tray-packaging lid material, comprising a stretch-oriented multilayer film according to claim 1.

13. A process for producing a stretch-oriented multilayer film, comprising the steps of:

co-extruding at least three species of melted thermoplastic resins to form a tubular product comprising at least three layers including an outer surface layer (a) comprising a thermoplastic resin other than polyamide resin, an intermediate layer (b) comprising a polyamide resin and an inner surface layer (c) comprising a sealable resin, cooling with water the tubular product to a temperature below a lowest one of the melting points of the thermoplastic resin, the polyamide resin and the sealable resin constituting the layers (a), (b) and (c), re-heating the tubular product to a temperature which is at most the lowest one of the melting points of the thermoplastic resin, the polyamide resin and the sealable resin constituting the layers (a), (b) and (c), vertically pulling the tubular product while introducing a fluid into the tubular product to stretch the tubular product in the vertical direction and the circumferential direction, thereby providing a biaxially stretched tubular film, folding the tubular film, again introducing a fluid into the folded tubular film to form a tubular film, heat-treating the tubular film from its outer surface layer (a) with steam or warm water until a relaxation ratio reaches at least 20% in at least one of the vertical direction and the circumferential direction, and cooling the heat-treated tubular film to provide a stretch-oriented multilayer film exhibiting an impact energy of at least 1.5 Joule at a conversion thickness of 50 μm at −10° C.

14. A process according to claim 13 wherein the biaxially stretched tubular film is formed by stretching the tubular product at ratios of at least 2.9 times in a vertical direction and at least 3 times in a circumferential direction while vertically pulling the tubular product.

15. A process according to claim 13, wherein the tubular film is heat-treated for the relaxation with steam or warm water at 75–95° C.

16. A multilayer film according to claim 2, wherein the surface layer (a) has a larger heat resistance than the surface layer (c).

17. A multilayer film according to claim 2, wherein the intermediate layer (b) has a larger thickness than the surface layer (a).

18. A multilayer film according to claim 3, wherein the intermediate layer (b) has a larger thickness than the surface layer (a).

19. A multilayer film according to claim 2, wherein the surface layer (a) comprises a stretch-oriented polyester resin.

20. A multilayer film according to claim 3, wherein the surface layer (a) comprises a stretch-oriented polyester resin.

21. A multilayer film according to claim 4, wherein the surface layer (a) comprises a stretch-oriented polyester resin.

22. A multilayer film according to claim 2, having a heat-shrinkability.

23. A multilayer film according to claim 3, having a heat-shrinkability.

24. A multilayer film according to claim 4, having a heat-shrinkability.

25. A multilayer film according to claim 5, having a heat-shrinkability.

26. A freeze-packaging material, comprising a stretch-oriented multilayer film according to claim 2.

27. A freeze-packaging material, comprising a stretch-oriented multilayer film according to claim 3.

28. A freeze-packaging material, comprising a stretch-oriented multilayer film according to claim 4.

29. A freeze-packaging material, comprising a stretch-oriented multilayer film according to claim 5.

30. A freeze-packaging material, comprising a stretch-oriented multilayer film according to claim 6.

31. A freeze-packaging material, comprising a stretch-oriented multilayer film according to claim 7.

32. A freeze-packaging material, comprising a stretch-oriented multilayer film according to claim 8.

33. A vertical pillow-packaging material, comprising a stretch-oriented multilayer film according to claim 2.

34. A vertical pillow-packaging material, comprising a stretch-oriented multilayer film according to claim 3.

35. A vertical pillow-packaging material, comprising a stretch-oriented multilayer film according to claim 4.

36. A vertical pillow-packaging material, comprising a stretch-oriented multilayer film according to claim 5.

37. A vertical pillow-packaging material, comprising a stretch-oriented multilayer film according to claim 6.

38. A vertical pillow-packaging material, comprising a stretch-oriented multilayer film according to claim 7.

39. A vertical pillow-packaging material, comprising a stretch-oriented multilayer film according to claim 8.

40. A deep drawing-packaging material, comprising a stretch-oriented multilayer film according to claim 2.

41. A deep drawing-packaging material, comprising a stretch-oriented multilayer film according to claim 3.

42. A deep drawing-packaging material, comprising a stretch-oriented multilayer film according to claim 4.

43. A deep drawing-packaging material, comprising a stretch-oriented multilayer film according to claim 5.

44. A deep drawing-packaging material, comprising a stretch-oriented multilayer film according to claim 6.

45. A deep drawing-packaging material, comprising a stretch-oriented multilayer film according to claim 7.

46. A deep drawing-packaging material, comprising a stretch-oriented multilayer film according to claim 8.

47. A tray-packaging lid material, comprising a stretch-oriented multilayer film according to claim 2.

48. A tray-packaging lid material, comprising a stretch-oriented multilayer film according to claim 3.

49. A tray-packaging lid material, comprising a stretch-oriented multilayer film according to claim 4.

50. A tray-packaging lid material, comprising a stretch-oriented multilayer film according to claim 5.

51. A tray-packaging lid material, comprising a stretch-oriented multilayer film according to claim 6.

52. A tray-packaging lid material, comprising a stretch-oriented multilayer film according to claim 7.

53. A tray-packaging lid material, comprising a stretch-oriented multilayer film according to claim 8.

54. A process according to claim 14, wherein the tubular film is heat-treated for the relaxation with steam or warm water at 75–95° C.

* * * * *